United States Patent
Fujita et al.

(10) Patent No.: US 8,310,545 B2
(45) Date of Patent: Nov. 13, 2012

(54) APPARATUS AND METHOD FOR ANALYZING ROAD VIEW

(75) Inventors: Ryujiro Fujita, Tsurugashima (JP);
Hiroto Inoue, Tsurugashima (JP);
Naohiko Ichihara, Tsurugashima (JP);
Takehiko Shioda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1736 days.

(21) Appl. No.: 10/594,946

(22) PCT Filed: Mar. 15, 2005

(86) PCT No.: PCT/JP2005/005050
§ 371 (c)(1),
(2), (4) Date: Dec. 12, 2006

(87) PCT Pub. No.: WO2005/093657
PCT Pub. Date: Oct. 6, 2005

(65) Prior Publication Data
US 2007/0211144 A1    Sep. 13, 2007

(30) Foreign Application Priority Data
Mar. 29, 2004  (JP) .................. 2004-095734

(51) Int. Cl.
H04N 7/00 (2011.01)
G06K 9/00 (2006.01)
B60Q 1/00 (2006.01)

(52) U.S. Cl. .................. 348/148; 382/104; 340/435

(58) Field of Classification Search .............. 348/148, 348/118–122; 340/425.5, 435, 903; 382/104, 382/224; H04N 7/00; G06K 9/00; B60Q 1/00
See application file for complete search history.

(56) References Cited

U.S. PATENT DOCUMENTS
5,521,633 A * 5/1996 Nakajima et al. ............. 348/118
(Continued)

FOREIGN PATENT DOCUMENTS
JP       6-107096 A    4/1994
(Continued)

OTHER PUBLICATIONS

Okada R et al., "Obstacle detection based on motion constraint of virtual planes" Proceedings of the 2002 IEEE/RSJ International Conference on Intelligent Robots and Systems. (IROS 2002). Lausanne, Switzerland, Sep. 30-Oct. 4, 2002, IEEE/RSJ International Conference on Intelligent Robots and Systems, New York, NY : IEEE, US. vol. vol. 1 of 3, Sep. 30, 2002, pp. 61-66, XP010609229. ISBN: 0-7803-7398-7.

G. L. Foresti, "Outdoor Scene Classification by a Neural Tree-Based Approach" Pattern Analysis & Applications, [Online] vol. 2, No. 2, Jun. 1999, pp. 129-142, XP002431008 Springer, London. Retrieved from the Internet: URL: http://www.springerlink.com/content/hpokmhmnvbhgtklj/fulltext. pdf> [retrieved on Apr. 24, 2007].

(Continued)

*Primary Examiner* — Gims Philippe
(74) *Attorney, Agent, or Firm* — Sughrue Mion, PLLC

(57) ABSTRACT

A road view analyzing apparatus and a road view analyzing method that can obtain an accurate analysis result on a road view in front of a vehicle are provided. The road view analyzing apparatus includes a camera that is mounted on the vehicle to photograph a view in front of the vehicle, image dividing means for dividing the image of the view in front of the vehicle photographed by the camera into a plurality of areas with diagonal lines, and analyzing means for separately analyzing content of the image in each of the plurality of areas.

13 Claims, 5 Drawing Sheets

U.S. PATENT DOCUMENTS

| | | | | |
|---|---|---|---|---|
| 5,706,355 | A * | 1/1998 | Raboisson et al. | 382/104 |
| 6,191,704 | B1 * | 2/2001 | Takenaga et al. | 340/903 |
| 6,445,809 | B1 * | 9/2002 | Sasaki et al. | 382/104 |
| 6,765,480 | B2 * | 7/2004 | Tseng | 340/425.5 |
| 6,829,388 | B1 * | 12/2004 | Sakurai | 382/199 |
| 6,985,075 | B2 * | 1/2006 | Takeda | 340/435 |
| 2004/0234136 | A1 * | 11/2004 | Zhu et al. | 382/224 |

FOREIGN PATENT DOCUMENTS

| | | |
|---|---|---|
| JP | 6-333192 A | 12/1994 |
| JP | 2000-57353 A | 2/2000 |
| JP | 2001-88636 A | 4/2001 |
| JP | 2002-163642 A | 6/2002 |
| JP | 2003-67727 A | 3/2003 |
| JP | 2004-54751 A | 2/2004 |

OTHER PUBLICATIONS

Aude Oliva and Antonio Torralba: "Modeling the Shape of the Scene: A Holistic Representation of the Spatial Envelope" International Journal of Computer Vision, [Online] vol. 42, No. 3, May 2001, pp. 145-175, XP002431009 Springer Netherlands Retrieved from the Internet: URL:http://www.springerlink.com/content/k62tg81w8352g71h/fulltext.pdf> [retrieved on Apr. 24, 2007].

* cited by examiner

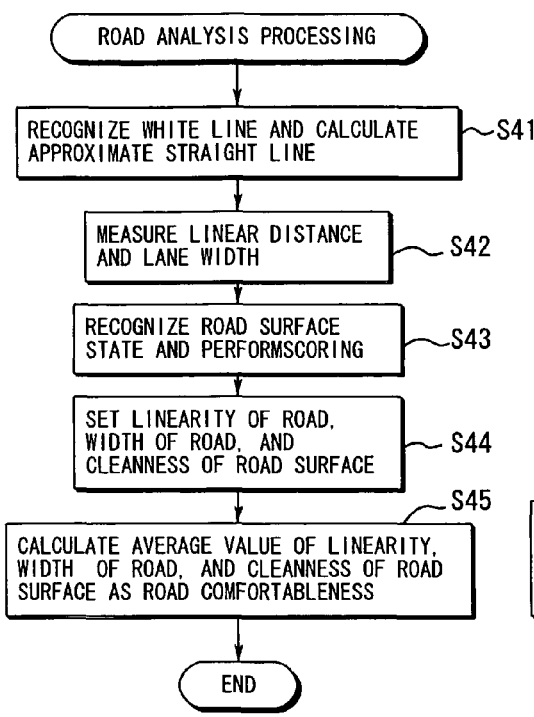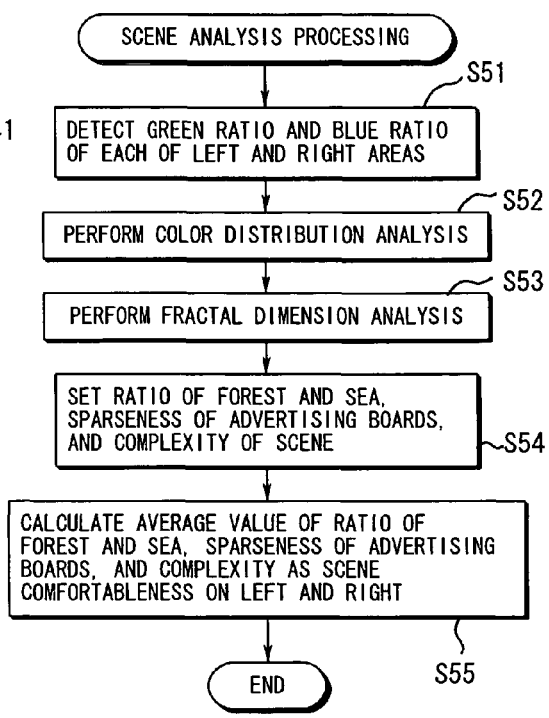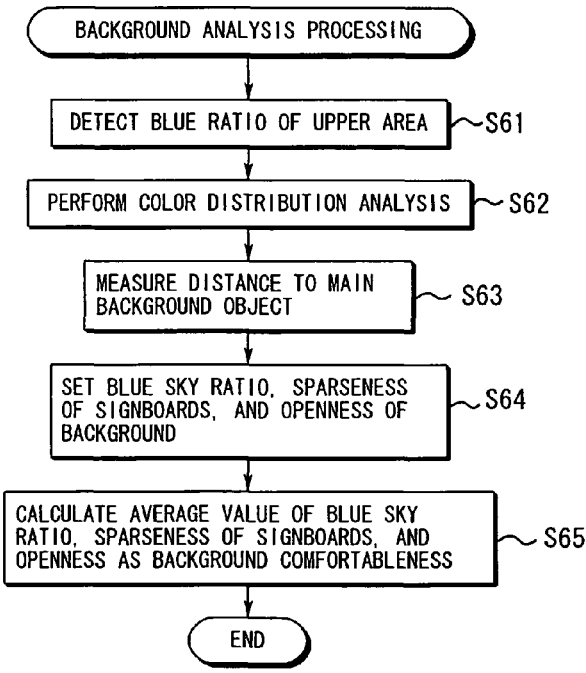

FIG. 7

| ROAD AREA | |
|---|---|
| LINEARITY OF ROAD | 8 0 |
| CLEANNESS OF ROAD SURFACE | 7 0 |
| WIDTH OF ROAD | 9 0 |
| ROAD COMFORTABLENESS | 8 0 |

FIG. 8

| | LEFT SCENE AREA | RIGHT SCENE AREA |
|---|---|---|
| RATIO OF FOREST AND SEA | 9 0 | 9 0 |
| SPARSENESS OF ADVERTISING BOARDS | 8 0 | 6 0 |
| COMPLEXITY | 7 0 | 8 5 |
| SCENE COMFORTABLENESS | 8 0 | 7 8. 3 |

FIG. 9

| ROAD AREA | |
|---|---|
| BLUE SKY RATIO | 1 0 0 |
| SPARSENESS OF SIGNBOARDS | 7 0 |
| OPENNESS | 8 0 |
| BACKGROUND COMFORTABLENESS | 8 3. 3 |

APPARATUS AND METHOD FOR ANALYZING ROAD VIEW

TECHNICAL FIELD

The present invention relates to a road view analyzing apparatus and a road view analyzing method for analyzing a view including a road in front of a vehicle.

BACKGROUND ART

As a conventional method of analyzing a road view in front of a vehicle, there is a method for taking a road view image photographed by a camera into a computer and analyzing the road view image with respect to all the taken image. As a specific analyzing method thereof, a method for applying fractal analysis to all the image in order to calculate a degree of complexity of a view, calculating a green visibility factor of trees and plants, and calculating a ratio of a road occupying the image as a road ratio is adopted.

However, in the conventional road view analysis, there is a problem in that it is impossible to obtain an accurate analysis result on a road view in front of a vehicle simply by analyzing an image of a view in front of the vehicle photographed by a camera using various analyzing methods such as fractal analysis.

DISCLOSURE OF INVENTION

It is an object of the present invention to provide a road view analyzing apparatus and a road view analyzing method that can obtain an accurate analysis result on a road view in front of a vehicle.

The road view analyzing apparatus of the invention is a road view analyzing apparatus having a camera mounted on a vehicle to photograph a view in front of the vehicle, for analyzing a road view indicated by an image of the view in front of the vehicle photographed by the camera. The road view analyzing apparatus comprises: image dividing means for dividing the image of the view in front of the vehicle photographed by the camera into a plurality of areas with diagonal lines; and analyzing means for separately analyzing content of the image in each of the plurality of areas.

The road view analyzing method of the invention is a road view analyzing method of analyzing a road view indicated by an image of a view in front of a vehicle obtained by photographing the view in front of the vehicle. The road view analyzing method comprises: an image dividing step of dividing the image of the view in front of the vehicle into a plurality of areas with diagonal lines; and an analyzing step of separately analyzing content of the image in each of the plurality of areas.

BRIEF DESCRIPTION OF DRAWINGS

FIG. 4 is a flowchart showing road analysis processing;
FIG. 5 is a flowchart showing scene analysis processing;
FIG. 6 is a flowchart showing background analysis processing;
FIG. 7 is a table showing respective indexes of a result of the road analysis processing and a degree of road comfort;
FIG. 8 is a table showing respective indexes of a result of the scene analysis processing and a degree of scene comfort;
and
FIG. 9 is a table showing respective indexes of a result of the background analysis processing and a degree of background comfort.

DETAILED DESCRIPTION OF THE INVENTION

An embodiment of the invention will be hereinafter explained in detail with reference to the drawings.

Figure 1:
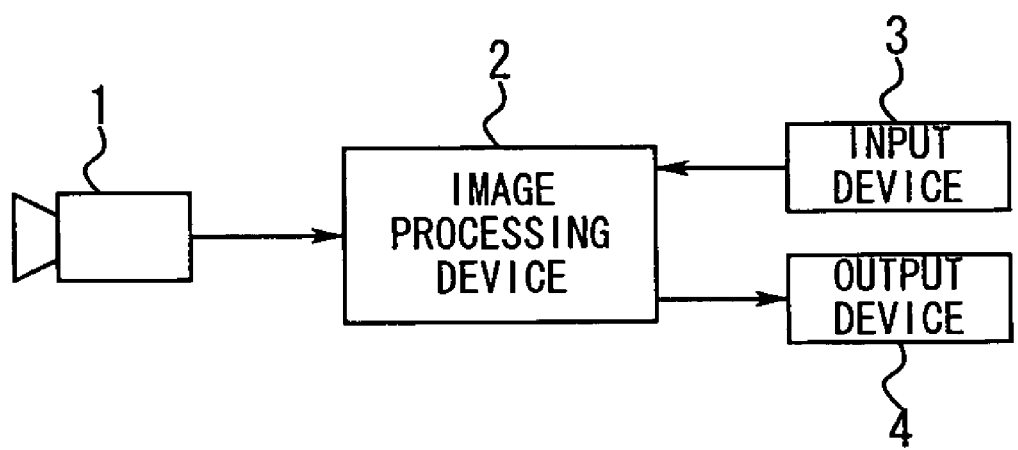
FIG. 1 is a block diagram showing an embodiment of the invention.

FIG. 1 shows a road view analyzing apparatus according to the invention. The road view analyzing apparatus is mounted on a vehicle and includes a camera 1, an image processing device 2, an input device 3, and an output device 4. The camera 1 includes for example, a CCD camera and is attached to the vehicle to photograph a view in front of the vehicle. An output of the camera 1 is connected to the image processing device 2.

The image processing device 2 includes, for example, a microcomputer, and inputs image data supplied from the camera 1. The image processing device 2 executes analysis processing on a road view indicated by the image data. Details of the analysis processing will be described later.

The input device 3 and the output device 4 are connected to the image processing device 2. The input device 3 includes, for example, a keyboard and supplies a command corresponding to an input operation to the image processing device 2. The output device 4 includes, for example, a display and displays the analysis processing for a road view by the image processing device 2.

Figure 2:
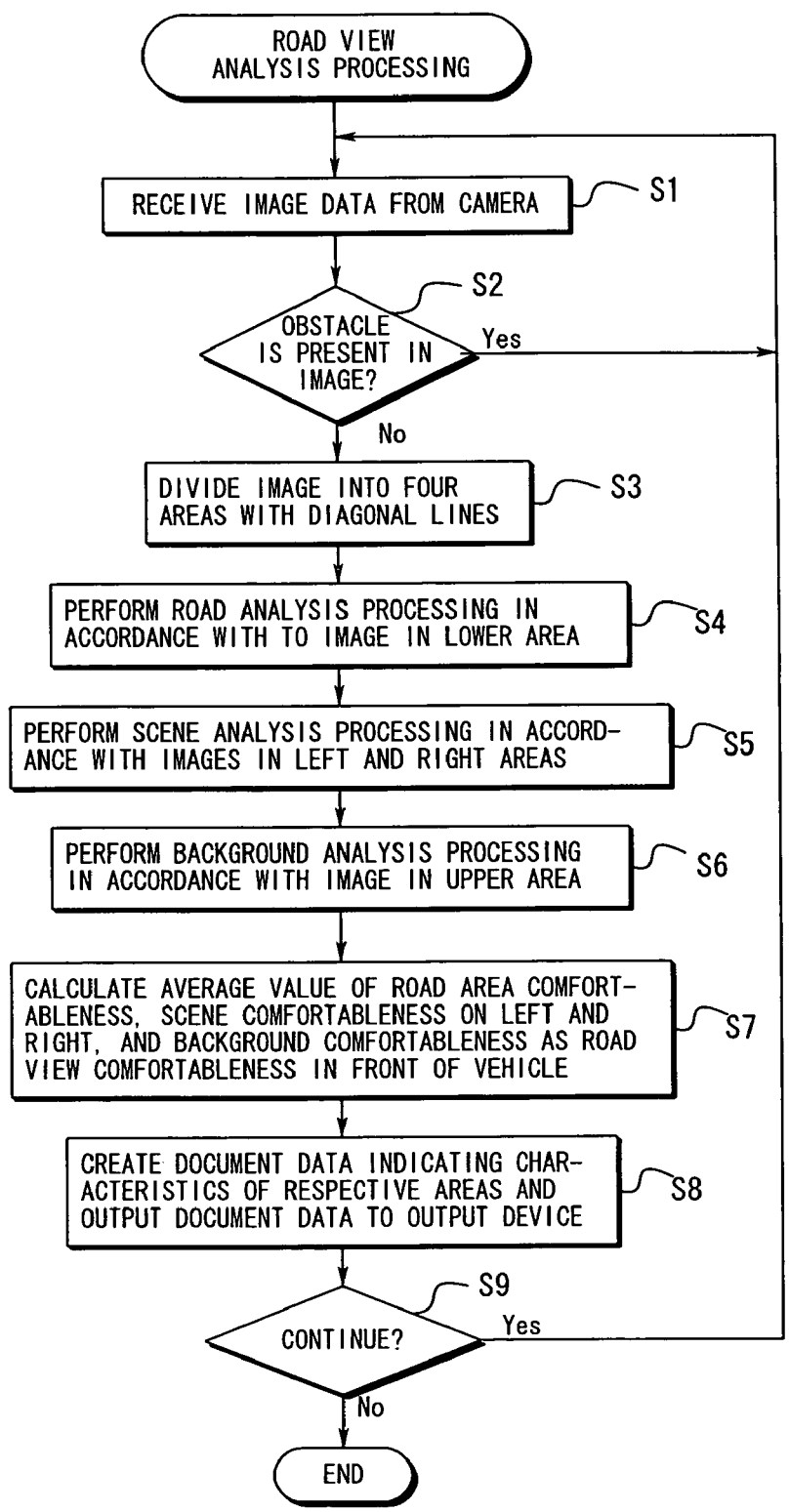
FIG. 2 is a flowchart showing road view analyzing processing.

In the road view analysis processing, as shown in FIG. 2, first, a processor (not shown) in the image processing device 2 receives image data from the camera 1 (step S1) and judges whether an obstacle is present in an image (a still image) indicated by the image data (step S2). The obstacle is a preceding vehicle or a parked vehicle other than the road view. For example, the image data newly received this time is compared with a plurality of image data pieces which are received up to the time immediately before newly receiving the image data to judge that at least one obstacle is present. If at least one obstacle is present, the process returns to step S1 to receive new image data. Since the case where no obstacle is present at all is not always occurred, in step S2, the process may judge whether a total quantity of obstacle portions indicated in the image is larger than a threshold.

Figure 3:
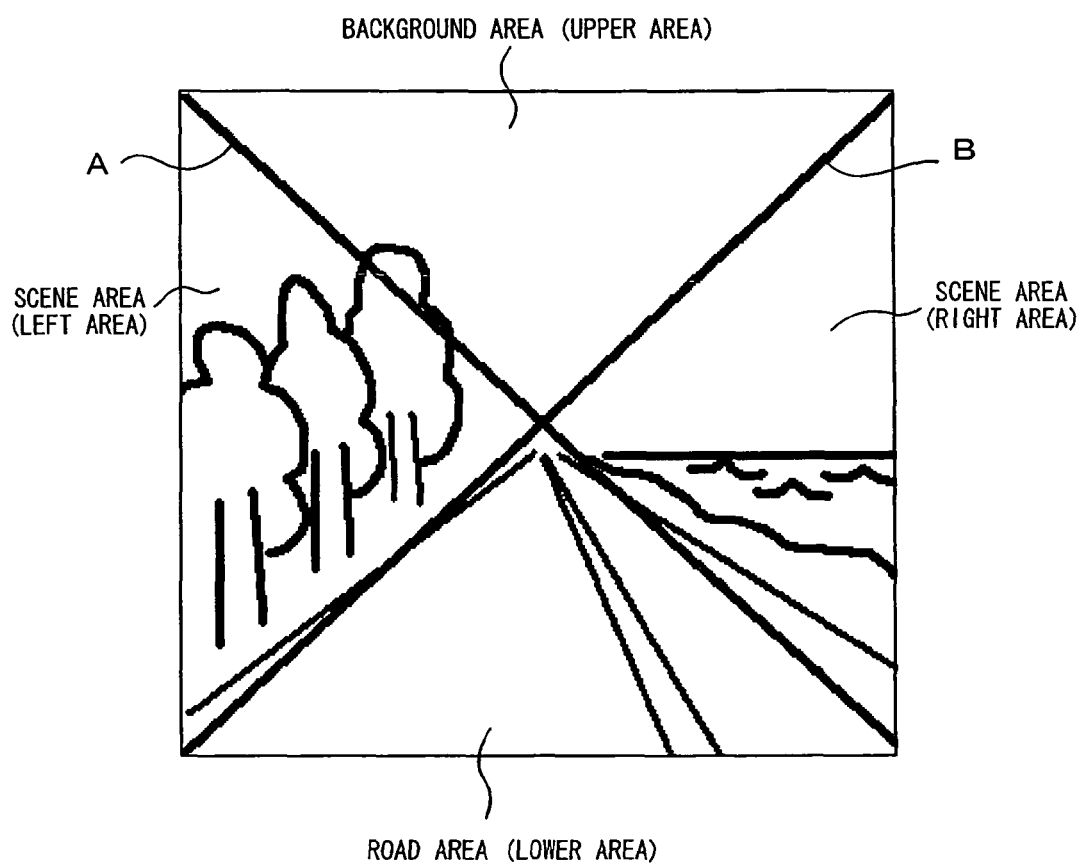
FIG. 3 is a diagram showing division of a road view image into four images.

When no obstacle is present in the image, the image is divided into four areas with diagonal lines (step S3). As shown in FIG. 3, the image has a square shape and is divided into four areas, left area, right area, upper area and lower area by diagonal lines A and B. The upper area is set as a background area, the lower area is set as a road area, and the left and the right areas are set as scene areas.

Road analysis processing is performed in accordance with an image in the lower area (step S4), scene analysis processing is performed in accordance with images in the left and the right areas (step S5), and background analysis processing is performed in accordance with an image in the upper area (step S6).

In the road analysis processing in step S4, as shown in FIG. 4, white line recognition and approximate straight line calculation are performed (step S41). In other words, a white line on the road is recognized and an approximate straight line of the white line is calculated. As a white recognition method, there is a method disclosed in JP-A-6-333192. In this white line recognition method, white line candidate points are extracted on the basis of image data, a frequency distribution of angles each of which is an angle between a reference line and a straight line between two points of the white line candidate points is obtained, an actual between the reference line and a white line and actual candidate points included in the white line are extracted on the basis of the frequency distribution. In addition, an approximate straight line of the white line is determined on the basis of the actual angle and the actual candidate points.

Subsequently, linear distance measurement and lane width measurement are performed (step S42). In the linear distance measurement, a point where the white line recognized deviates from the approximate straight line is detected. A distance of a straight line to the detected point is set as a linear distance. As the linear distance is larger, it is judged that it is easier and more comfortable to drive on the road and a higher score is set. As the road is a sharper curved road that cannot be subjected to linear approximation, a lower score is set. As the lane width measuring method, for example, there is a method disclosed in JP-A-2002-163642. In other words, a lane position on a road is specified and a lane width is estimated on the basis of the present lane position and histories in the past of the lane position.

Moreover, road surface state recognition and scoring are performed (step S43). The road surface state recognition is to identify, in accordance with color distribution analysis, whether a road surface is paved. Road surface states corresponding to weathers such as dry, wet, and snow may be recognized. JP-A-2001-88636 discloses a method for recognizing road surface states such as snow and a gravel road. This method may be used. In the scoring, a paved road surface corresponds to a high score and an unpaved road corresponds to a low score.

Linearity of the road, a width of a road, and cleanness of the road surface are set in accordance with respective road parameter values obtained by the execution of steps S41 to S43 (step S44). In other words, the linearity of the road is set in accordance with the linear distance, the road width is set in accordance with the lane width, and the cleanness of the road surface is set in accordance with a road surface state value. As each of the linearity of the road, the road width, and the cleanness of the road surface, a value in a range of 0 to 100 is set in accordance with similarity with a reference value thereof. An average value of the linearity of the road, the road width, and the cleanliness of the road surface set in step S44 is calculated (step S45). The average value indicates comfortableness of the road area.

In the scene analysis processing in step S5, as shown in FIG. 5, green ratios and blue ratios of the left and the right areas are analyzed (step S51). For each of the left and the right areas, the number of pixels in a green portion (including similar colors) in the area is extracted and a ratio of the number of pixels in the green portion to a total number of pixels in the area is set as a green ratio. Similarly, for each of the left and the right areas, the number of pixels in a blue portion (including similar colors) in the area is extracted and a ratio of the number of pixels in the blue portion to a total number of pixels in the area is set as a blue ratio. The green ratio is a ratio of a forest in each of the left and the right areas. The blue ratio is a ratio of the sea in each of the left and the right areas.

Subsequently, the color distribution analysis is performed (step S52). A color distribution is calculated by calculating the numbers of pixels of the respective colors in each of the left and the right areas as a histogram. Further, fractal dimension analysis for each of the left and the right areas is also performed (step S53). Quality of a view is evaluated in accordance with a value of a fractal dimension. The quality evaluation for a view using the fractal dimension analysis is disclosed in JP-A-2000-57353. In the patent application publication, Quality of a view is evaluated high when a value of a fractal dimension is in a range of 1.50 to 1.65 in values between 0 and 2.

A ratio of the forest and the sea, sparseness of advertising boards, and complexity of a scene are set in accordance with the respective scene parameter values obtained by the execution of steps S51 to S53 (step S54). In other words, the ratio of the forest and the sea is set in accordance with a green ratio and a blue ratio, respectively, the advertising board sparseness is set in accordance with the color distribution, and the scene complexity is set in accordance with a value of the fractal dimension. As each of the ratio of the forest and the sea, the advertising board sparseness, and the scene complexity, a value in a range of 0 to 100 is set in accordance with similarity with a reference value thereof. An average value of the ratio of the forest and the sea, the advertising board sparseness, and the scene complexity set in step S54 is calculated in each of the left and the right areas (step S55). The average value indicates scene comfortableness on each of the left and the right.

In the scene analysis processing in step S6, as shown in FIG. 6, a blue ratio in the upper area is analyzed (step S61). The number of pixels in a blue portion (including similar colors) in the upper area is extracted and a ratio of the number of pixels in the blue portion to a total number of pixels in the area is set as a blue ratio. The blue ratio is a ratio of a blue sky in the upper area.

Subsequently, the color distribution analysis is performed (step S62). A color distribution is calculated by calculating the numbers of pixels of the respective colors in the upper area as a histogram. Advertising boards, overpasses, and mountains in the distant view are analyzed in accordance to the color distribution analysis. Further, distance measurement is also performed (step S63). The distance measurement is to measure distances to main background objects such as the sky, mountains in the distant view, an overpass, and a tunnel in the color distribution analysis. An optical flow is calculated using an image photographed and an image in an immediately preceding frame to measure distances to objects in an area. If a distance is infinity, it is judged that there is no object. In the disclosure in JP-A-6-107096, movement of an identical point on target objects shown in images of two frames, which are temporally continuous, in a series of front view moving images picked up is detected as an optical flow vector.

A blue sky ratio, sparseness of signboards, and openness of the background are set in accordance with the respective background parameter values obtained by the execution of steps S61 to S63 (step S64). In other words, the blue sky ratio is set in accordance with the blue ratio, the signboard sparseness is set in accordance with the color distribution, and the background openness is set in accordance with the distances to the sky, mountains in the distant view, overpasses, and tunnels. As each of the blue sky ratio, the sparseness of signboards, and the openness, a value in a range of 0 to 100 is set in accordance with similarity to a reference value thereof, respectively. An average value of the blue sky ratio, the sparseness of signboards, and the openness set in step S64 is calculated (step S65). The average value indicates background comfortableness.

After the analysis processing for the respective areas is performed in this manner, an average value of the road area comfortableness, the scene comfortableness on the left and the right, and the background comfortableness is calculated as road view comfortableness in front of the vehicle (step S7). The processor prepares document data indicating characteristics of the respective areas and outputs the document data to the output device 4 (step S8). In step S8, characteristic items with a value equal to or higher than 90 in the respective areas are detected and the document data is prepared by connecting the detected characteristic items. Content of the document data prepared is displayed on the output device 4 together with the road view comfortableness.

Assuming that a vehicle is running on a tree-lined road, which is a two-lane straight road, respective values of linearity of the road area, the road width, and the cleanness of the road surface and road area comfortableness are obtained as shown in FIG. 7 as a result of the road analysis processing in step S4. As a result of the scene analysis processing in step S5, respective values of the ratio of the forest and the sea, the sparseness of advertising boards, and the complexity of the scene and scene comfortableness for each of the left and the right areas are obtained as shown in FIG. 8. As a result of the background analysis processing in step S6, respective values of the blue sky ratio, the sparseness of signboards, and the openness of the background and background comfortableness are obtained as shown in FIG. 9. An average value of the road area comfortableness 80 in FIG. 7, the left scene comfortableness 80 and the right scene comfortableness 78.3 in FIG. 8, and the background comfortableness 83.3 in FIG. 9 is the road scene comfortableness in step S7, which is 80.4. Since characteristic items with a value equal to or higher than 90 in the respective areas are "a width of a road", "a ratio of a forest and a sea", and "a blue sky ratio", in step S8, the document data is prepared as a "wide road with two or more lanes surrounded by a blue sky and a forest".

After the execution of step S8, the processor judges whether the road view analysis processing should be continued (step S9). For example, when the road view analysis processing is continued in accordance with an operation input of the input device 3, the processor returns to step S1 and repeats the operations in steps S1 to S9. On the other hand, when the road view analysis processing is not continued, the processor ends the road view analysis processing.

In the embodiment described above, presence of obstacles in an image is judged and analysis of a road view is applied to an image with fewer obstacles. Thus, it is possible to automatically and accurately judge the road view. Obstacles may be removed from an image to applying the road view analysis to the image rather than applying the road view analysis to an image with fewer obstacles.

In the embodiments described above, sectioning of areas of an image is fixed by the diagonal lines. However, the sectioning of areas may be variable. For example, it is also possible that an area up to a white line in the outermost part is set as a road area in accordance with white line recognition and a moving distance is calculated from an amount of change from an image photographed a short time before to section a scene area and a background area. Thereby, the scene area and the background area can be sectioned by applying a threshold to the moving distance.

In the embodiment described above, other methods such as frequency analysis may be used as the image analysis method for the respective areas.

In the example explained in detail in the embodiment, an image of a view in front of a vehicle is divided into four areas by two diagonal lines. However, the number of diagonal lines and the number of divided areas are not limited to these numbers.

As described above, according to the invention, an image obtained by photographing a view in front of a vehicle is divided into a plurality of areas by diagonal lines and content of an image in each of the plurality of areas is separately analyzed. Thus, it is possible to obtain an accurate analysis result on a road view in front of the vehicle.

It is possible to apply the invention to a car audio apparatus and a car navigation apparatus.

The invention claimed is:

1. A road view analyzing apparatus having a camera mounted on a vehicle to photograph a view in front of the vehicle, for analyzing a road view indicated by an image of the view in front of the vehicle photographed by the camera, the road view analyzing apparatus comprising:

an image dividing portion which divides the image of the view in front of the vehicle photographed by the camera into a plurality of areas with diagonal lines; and an analyzing portion which applies road analysis processing to an image in a lower area of the plurality of areas, scene analysis processing to an image in each of left and right areas of the plurality of areas, and background analysis processing to an image in an upper area of the plurality of areas, wherein for the road analysis processing, said analyzing portion includes:

a portion which recognizes a white line on a road in accordance with the image in the lower area to calculate an approximate straight line of the white line;

a portion which measures a linear distance of the approximate straight line;

a portion which measures a lane width in accordance with the approximate straight line; and a portion which recognizes a road surface state in accordance with the image in the lower area.

2. A road view analyzing apparatus having a camera mounted on a vehicle to photograph a view in front of the vehicle, for analyzing a road view indicated by an image of the view in front of the vehicle photographed by the camera, the road view analyzing apparatus comprising:

an image dividing portion which divides the image of the view in front of the vehicle photographed by the camera into a plurality of areas with diagonal lines, an analyzing portion which applies road analysis processing to an image in a lower area of the plurality of areas, scene analysis processing to an image in each of left and right areas of the plurality of areas, and background analysis processing to an image in an upper area of the plurality of areas, wherein said analyzing portion includes a portion which sets indexes of a plurality of road characteristics, respectively, in accordance with a result of the road analysis processing;

a portion which sets indexes of a plurality of scene characteristics, respectively, for each of the left and the right areas in accordance with a result of the scene analysis processing;

a portion which sets indexes of a plurality of background characteristics, respectively, in accordance with a result of the background analysis processing;

a portion which calculates an average value of the indexes of the plurality of road characteristics as road comfortableness;

a portion which calculates an average value of the indexes of the plurality of scene characteristics as scene comfortableness on the left and the right for each of the left and the right areas;

a portion which calculates an average value of the indexes of the plurality of background characteristics as background comfortableness; and a portion which calculates an average value of the road comfortableness, the scene comfortableness on the left and the right, and the background comfortableness.

3. The road view analyzing apparatus according to claim 2, wherein said analyzing portion includes a document data creating portion which creates document data including a road characteristic of a maximum value of the indexes of the plurality of road characteristics, a scene characteristic of a maximum value of the indexes of the plurality of scene characteristics, and a background characteristic of a maximum value of the indexes of the plurality of background characteristics.

4. The road view analyzing apparatus according to claim 2, wherein the plurality of road characteristics are linearity of a road, cleanness of a road surface, and a breadth of a road width,
the plurality of scene characteristics are a ratio of a forest and a sea, sparseness of advertising boards, and complexity, and
the plurality of background characteristics are a blue sky ratio, sparseness of signboards, and openness.

5. The road view analyzing apparatus according to claim 1, further comprising:
a portion which judges whether an obstacle is present in the image of the view in front of the vehicle photographed by the camera; and
a portion which activates said image dividing portion and said analyzing portion when the obstacle is not present in the image of the view in front of the vehicle.

6. The road view analyzing apparatus according to claim 5, wherein the obstacle is a vehicle.

7. A road view analyzing apparatus having a camera mounted on a vehicle to photograph a view in front of the vehicle, for analyzing a road view indicated by an image of the view in front of the vehicle photographed by the camera, the road view analyzing apparatus comprising:
an image dividing portion which divides the image of the view in front of the vehicle photographed by the camera into a plurality of areas; and
an analyzing portion which separately analyzes content of the image in each of the plurality of areas,
wherein said image dividing portion applies white line recognition to the image of the view in front of the vehicle and sets an area up to a white line in the outermost part by the white line recognition as a road area,
and wherein said image dividing portion calculates a moving distance from an amount of change between the image of the view in front of the vehicle photographed by the camera and an image of a view in front of the vehicle photographed temporally earlier than the image and applies a threshold to the moving distance to obtain sectional areas of a scene area and a background area.

8. A road view analyzing method of analyzing a road view indicated by an image of a view in front of a vehicle obtained by photographing the view in front of the vehicle, the road view analyzing method comprising:
an image dividing step of dividing the image of the view in front of the vehicle into a plurality of areas with diagonal lines; and
an analyzing step of applying road analysis processing to an image in a lower area of the plurality of areas, applying scene analysis processing to an image in each of left and right areas of the plurality of areas, and applying background analysis processing to an image in an upper area of the plurality of areas,
wherein for the road analysis processing, said analyzing step includes:

a step of recognizing a white line on a road in accordance with the image in the lower area to calculate an approximate straight line of the white line;
a step of measuring a linear distance of the approximate straight line;
a step of measuring a lane width in accordance with the approximate straight line; and
a step of recognizing a road surface state in accordance with the image in the lower area.

9. A road view analyzing method of analyzing a road view indicated by an image of a view in front of a vehicle obtained by photographing the view in front of the vehicle, the road view analyzing method comprising:
an image dividing step of dividing the image of the view in front of the vehicle into a plurality of areas with diagonal lines; and
an analyzing step of separately analyzing content of the image in each of the plurality of areas,
wherein in said image dividing step, white line recognition is applied to the image of the view in front of the vehicle and an area up to a white line in the outermost part by the white line recognition is set as a road area, and
wherein in said image dividing step, a moving distance is calculated from an amount of change between the image of the view in front of the vehicle photographed by the camera and an image of a view in front of the vehicle photographed temporally earlier than the image and a threshold to the moving distance is applied to obtain sectional areas of a scene area and a background area.

10. A road view analyzing apparatus having a camera mounted on a vehicle to photograph a view in front of the vehicle, for analyzing a road view indicated by an image of the view in front of the vehicle photographed by the camera, the road view analyzing apparatus comprising:
an image dividing portion which divides the image of the view in front of the vehicle photographed by the camera into a plurality of areas with diagonal lines; and
an analyzing portion which applies road analysis processing to an image in a lower area of the plurality of areas, scene analysis processing to an image in each of left and right areas of the plurality of areas, and background analysis processing to an image in an upper area of the plurality of areas,
wherein for the scene analysis processing, said analyzing portion includes:
a portion which detects a green ratio and a blue ratio of the image in each of the left and the right areas to estimate a ratio of a forest and a sea;
a portion which detects a color distribution of the image in each of the left and the right areas; and
a portion which performs fractal dimension analysis for the image in each of the left and the right areas.

11. A road view analyzing apparatus having a camera mounted on a vehicle to photograph a view in front of the vehicle, for analyzing a road view indicated by an image of the view in front of the vehicle photographed by the camera, the road view analyzing apparatus comprising:
an image dividing portion which divides the image of the view in front of the vehicle photographed by the camera into a plurality of areas with diagonal lines; and
an analyzing portion which applies road analysis processing to an image in a lower area of the plurality of areas, scene analysis processing to an image in each of left and right areas of the plurality of areas, and background analysis processing to an image in an upper area of the plurality of areas, wherein for the background analysis processing, said analyzing portion includes:
a portion which detects a blue ratio of the image in the upper area to estimate a ratio of a blue sky;
a portion which detects a color distribution of the image in the upper area to estimate a background main object; and
a portion which measures a distance to the background main object.

12. A road view analyzing method of analyzing a road view indicated by an image of a view in front of a vehicle obtained by photographing the view in front of the vehicle, the road view analyzing method comprising:
an image dividing step of dividing the image of the view in front of the vehicle into a plurality of areas with diagonal lines; and
an analyzing step of applying road analysis processing to an image in a lower area of the plurality of areas, applying scene analysis processing to an image in each of left and right areas of the plurality of areas, and applying background analysis processing to an image in an upper area of the plurality of areas,
wherein for the scene analysis processing, said analyzing step includes:
a step of detecting a green ratio and a blue ratio of the image in each of the left and the right areas to estimate a ratio of a forest and a sea;
a step of detecting a color distribution of the image in each of the left and the right areas; and
a step of performing fractal dimension analysis for the image in each of the left and the right areas.

13. A road view analyzing method of analyzing a road view indicated by an image of a view in front of a vehicle obtained by photographing the view in front of the vehicle, the road view analyzing method comprising:
an image dividing step of dividing the image of the view in front of the vehicle into a plurality of areas with diagonal lines; and
an analyzing step of applying road analysis processing to an image in a lower area of the plurality of areas, applying scene analysis processing to an image in each of left and right areas of the plurality of areas, and applying background analysis processing to an image in an upper area of the plurality of areas
wherein for the background analysis processing, said analyzing step includes:
a step of detecting a blue ratio of the image in the upper area to estimate a ratio of a blue sky;
a step of detecting a color distribution of the image in the upper area to estimate a background main object; and
a step of measuring a distance to the background main object.

* * * * *